July 12, 1938.  A. WRIGHT  2,123,690
PROCESS AND APPARATUS FOR TESTING FOR SUGAR
Filed Jan. 16, 1936
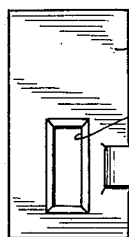
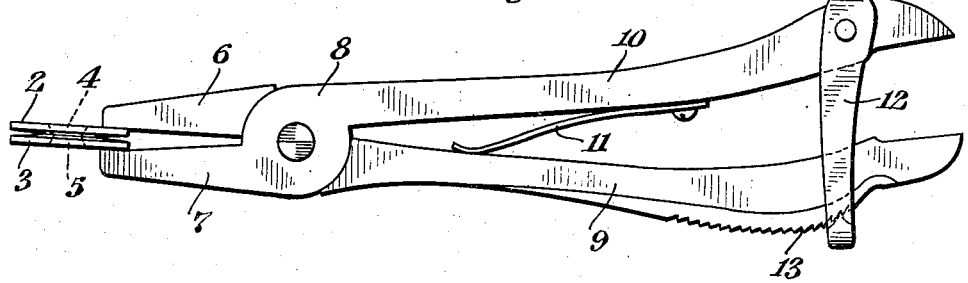
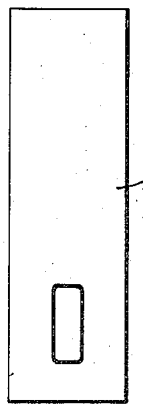
INVENTOR
Arthur Wright Patented July 12, 1938

2,123,690

UNITED STATES PATENT OFFICE 2,123,690

PROCESS AND APPARATUS FOR TESTING FOR SUGAR

Arthur Wright, Forest Hills, N. Y.

Application January 16, 1936, Serial No. 59,371

2 Claims. (Cl. 23—230)

My invention relates particularly to a process and apparatus for testing the presence of a sugar in substances generally and it has relation also to means for detecting sugar in any or all physiological liquids, such as blood, urine, etc., or water or other solutions of glucose.

The article constituting the testing means is contained in the applicant's copending application Ser. No. 40,442, filed September 13, 1935.

The object of my invention is to overcome the difficulty and disadvantages of previous testing means, and which usually required the heating of liquids in containers used in testing which were none too certain in action, difficult to control, subject to deterioration on standing, or required the use of cumbersome and expensive equipment or optical polarizers. The object of my invention is, further, to enable the presence of a sugar in substances to be readily and quickly ascertained with accuracy by a very inexpensive means, and which is also capable of being used by the layman. This makes it possible, furthermore, to carry out the tests repeatedly with expedition and accuracy and with a small, light testing means, and which forms a permanent record of the test. Again, another object is to enable the test to be made by merely heating prepared paper slightly containing the substance to be tested. In fact the heating can be done merely with a lighted match. Another object is to provide a dry testing material which can be readily transported and which will retain the testing properties indefinitely. The object is, furthermore, to provide a dry testing material containing an oxide of bismuth, preferably bismuth oxide, $Bi_2O_3$, which is pale yellowish and which, with or without the presence of any of the alkali metal hydroxides, such for example as sodium hydroxide, is reduced to black bismuth suboxide, BiO, or bismuth, if the test is positive, especially in the presence of glucose. Further objects will be seen from the following description of my invention, and while it is capable of embodiment in many different forms it is described in detail hereinafter only in certain embodiments thereof by way of illustration, and in connection with certain apparatus by way of illustration in the accompanying drawing, in which—

Fig. 1 is a plan view of an apparatus for making the tester;

Fig. 2 is a side elevation thereof; and

Fig. 3 is a plan view of the prepared sugar-testing asbestos strip.

For example, in carrying out my invention, I may provide a sheet or strip of asbestos paper 1, preferably about .008 or .006 inch in thickness, one inch wide and three inches long, and comprised of long-fiber asbestos made with an adhesive of any desired character but usually a burnable binder such as a starch paste amounting to about 2% by weight of the entire composition and which, when dried, provides a coherent strong asbestos paper. This strip is then clamped between two flat metal plates 2 and 3 with holes 4 and 5 therein, although one of the holes could be omitted, preferably rectangular, of the same size and shape but having inner beveled faces, in registry with each other, the plates 2 and 3 being mounted on pivoted jaws 6 and 7 of a clamp 8 having handles 9 and 10 normally kept apart by a spring 11, but adapted to be clamped together by a pivoted yoke 12 cooperating with teeth 13 on the handle 9, so as to cover the end of the asbestos strip while the area therein is being incinerated, and before or after being so clamped the strip, or the part opposite the holes 4 and 5, is made wet with a solution, as, for instance, a water or alcohol or glycerine solution, of any bismuth salt, as, for example, bismuth subnitrate, $BiONO_3.H_2O$, kept in solution in water in any desired way, as, for instance, by the presence of any mineral acid, as a little nitric acid, $HNO_3$, preferably an amount of 38° Bé. nitric acid slightly more than the volume of water present. However, preferably I wet the paper with a solution made by dissolving 8 grams of Rochelle salt (sodium potassium tartrate $$(CHOH)_2 COOK.COONa.4H_2O)$$

in 100 cc. of a 20% by weight solution of sodium hydroxide, which is warmed and to which is then added 4 grams of bismuth subnitrate until dissolved. The solution can be filtered, if desired. The Rochelle salt increases the solubility of the bismuth subnitrate and the sodium hydroxide aids in the reduction of the yellow $Bi_2O_3$ to black BiO by the glucose when present. Instead of the above salts of bismuth I may use any other bismuth salt in any liquid in which it dissolves even though only very slightly soluble therein, as, for instance, bismuth nitrate, $Bi(NO_3)_3$, or bismuth chloride, $BiCl_3$, or bismuth lactate, $$C_6H_9O_6Bi.7H_2O$$

As the bismuth salt, instead, I may use, if desired, bismuth subsalicylate, $C_6H_4(OH)COO.BiO$, or bismuth ammonium citrate. Or, the bismuth oxide, $Bi_2O_3$, itself can be applied suspended in water. The above may be used with or without the presence of the alkali metal hydroxide, and dissolves in any suitable liquid, as, for example, water, but preferably in the form of a saturated solution, or nearly saturated.

The sheet or strip of asbestos paper so clamped between the described metal plates, is then heated over the holes in the same by an oxidizing flame, as, for instance, the tip of a Bunsen burner flame or a blow pipe flame until all the starch is burned out in the areas of said holes and the bismuth compound is dried out or changed to $Bi_2O_3$, the plates 2 and 3 serving to effectively protect the strip from burning except at the holes 4 and 5. The heating is preferably to a high temperature but not a red heat and not enough to melt the $Bi_2O_3$. In the area heated, the remaining asbestos appears white, with a black ring around the heated area, due to the charred starch, etc. The clamped plates are then removed and the prepared dry strip is now ready for the making of the test.

If now the liquid to be tested for the glucose, before or after filtering to remove solids, is applied to the prepared strip either by putting a few drops of the liquid on the area that has been heated and which is defined by the black line, or preferably the entire end of the strip, containing the said area, is dipped into the liquid, the end of the strip, either while still wet or after being dried, adjacent the area, is then heated in an oxidizing flame, for instance either a Bunsen burner flame or even by a lighted match held under the end of the said area of the strip. The part of the strip outside of the said area that is heated will turn black due to the charring of the starch but the heated portion within the said area will remain white if there was no glucose present, whereas if glucose was present the heated area will become blackened by the formation of BiO, or metallic bismuth, due to the reduction of the bismuth compound present, $Bi_2O_3$, by the glucose. The amount of this blackening will indicate the amount of the glucose present. For instance, if 5% of glucose is present in the liquid the area will become very black, but if only ½% is present it will become greyish-black, and very much less will still give a grey reaction. Preferably the end of the strip is heated only until the strip outside the rectangular area is blackened half way along said area, and the amount of the glucose present will be observed by the darkened heated portion of the area compared with the unheated portion of the rectangular area. Also, the underside of the heated surface will show a darker reaction when heated in the flame of a Bunsen or similar burner, than the upper surface. Further heating of the heated area in the outside flame of the Bunsen burner will restore the area to a white appearance again, if desired, probably due to the formation of yellow $Bi_2O_3$, which can then be used in the same way over again for testing for glucose.

Many changes may be made in the above procedure and compositions, if desired.

In all of the above the uncharred area outside of the rectangular area acts as a convenient flexible non-fragile holding portion when testing the liquid and, also, acts to hold, without breaking, the heated area of asbestos, which otherwise would be so fragile to hold while making the test, as to be undesirable. Besides, the charring of this outside area to an intense black provides a sharp contrast to the rectangular testing area, which is an aid to the eye in testing.

While I have described my invention above in detail I wish it to be understood that many changes may be made therein without departing from the spirit of my invention.

I claim:

1. The process which comprises applying a solution of bismuth subnitrate to a restricted area in a sheet of heat resisting material and then heating said area to dryness to form bismuth oxide therein, then applying a glucose-containing substance to said area and heating to form a dark bismuth-containing substance therefrom.

2. The process which comprises applying a solution of bismuth subnitrate to a restricted area in a sheet of heat resisting material containing a burnable binder and then heating said area to dryness to form bismuth oxide therein and burn out the binder, then applying a glucose-containing substance to said area and heating to form a dark bismuth containing substance therefrom.

ARTHUR WRIGHT.